No. 875,470. PATENTED DEC. 31, 1907.
A. E. THOMSON.
MEASURING DEVICE.
APPLICATION FILED APR. 2, 1907.
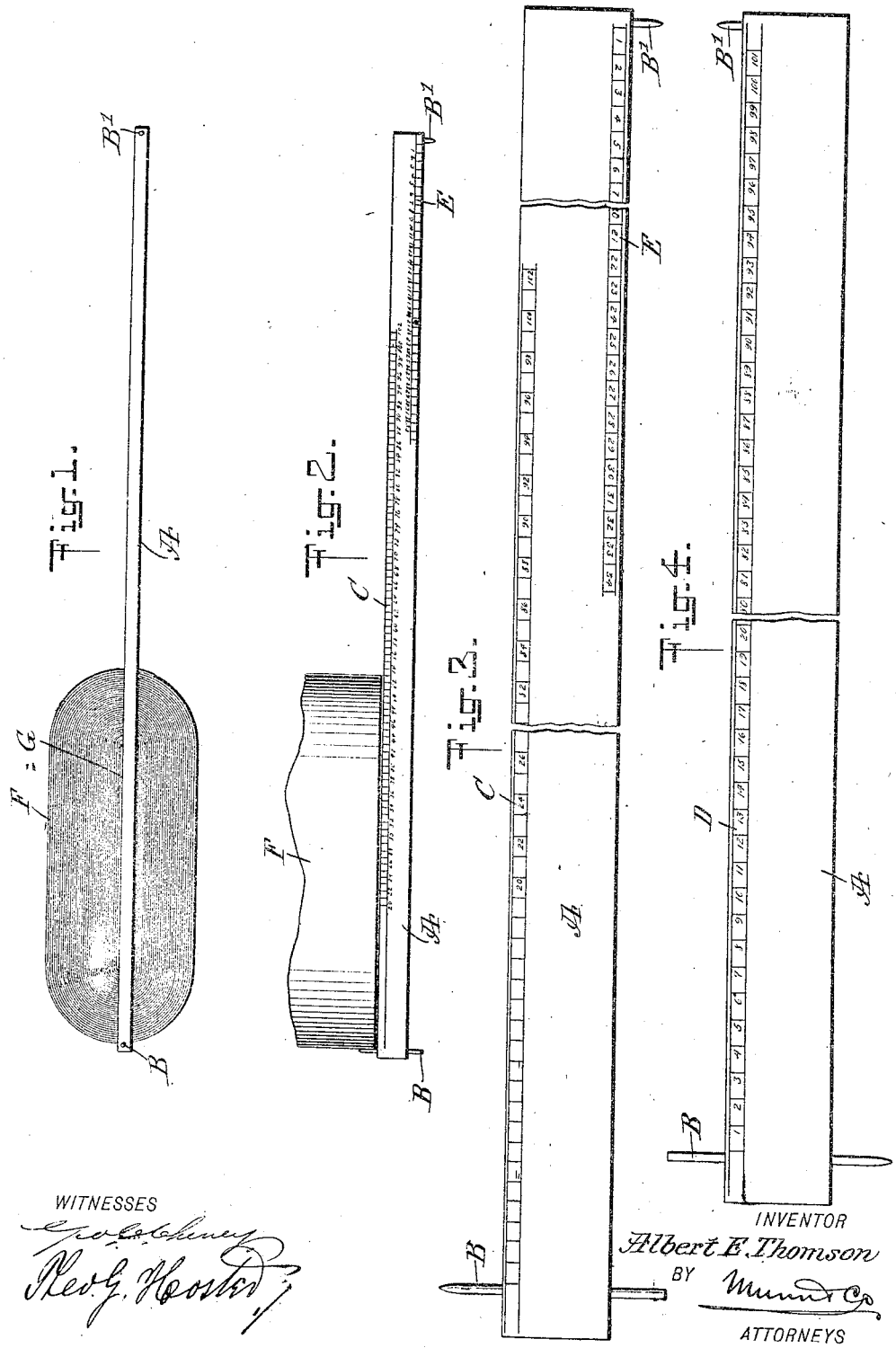
WITNESSES
INVENTOR
Albert E. Thomson
BY
ATTORNEYS

UNITED STATES PATENT OFFICE.

ALBERT EDWARD THOMSON, OF SIOUX FALLS, SOUTH DAKOTA.

MEASURING DEVICE.

No. 875,470.     Specification of Letters Patent.     Patented Dec. 31, 1907.

Application filed April 2, 1907. Serial No. 365,362.

*To all whom it may concern:*

Be it known that I, ALBERT EDWARD THOMSON, a citizen of the United States, and a resident of Sioux Falls, in the county of Minnehaha and State of South Dakota, have invented a new and Improved Measuring Device, of which the following is a full, clear, and exact description.

The object of the invention is to provide a new and improved measuring device, more especially designed for measuring bolts of cloth or other fabrics, and arranged to enable a storekeeper or other person to readily and accurately determine the yardage of the bolt without resorting to first unrolling the bolt and then measuring it with a yard stick or the like as heretofore practiced.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied to the end of a bolt of cloth rolled flat on a board; Fig. 2 is a plan view of the same; Fig. 3 is an enlarged plan view of the improvement, and Fig. 4 is a like view of the reverse side of the improvement.

A stick A of a suitable length is provided at one end with a transversely extending pin B, and on one face of the stick A is arranged a scale C and on the other side thereof is arranged a scale D, both scales C and D having their zero points registering with the inner side of the pin B. The scale C is for measuring bolts of cloth or like fabrics rolled flat on boards, while the scale D is more especially designed for measuring bolts rolled round, either solid or having a hollow center.

For measuring ribbons and the like a scale E, similar to the scale D, but not so long, is arranged on the face of the stick A, opposite the edge containing the scale C, as plainly indicated in Figs. 2 and 3, and for this scale E a separate small zero pin B' is provided on the corresponding end of the stick A.

The scales C, D and E are obtained in the following manner. On goods rolled on boards, I have found that a bolt whose diameter or width is 18 inches, has the same yardage as the number of folds in the bolt from center to outside, and that a bolt rolled round with a diameter of 22 10/11 inches, has the same number of yards as there are folds of cloth from center to outside. These lengths are divided into 100 equal parts, and these parts represent the divisions of the scale. It will be evident that should a flat bolt measure 45 units on its diameter, with 25 folds, there would be a yardage of 45/100 times 25, or 11 25/100 yards. It will be evident from the above, that the number of units which represent the length of the diameter, represent also the average length of the folds and that this average length multiplied by the number of folds gives the yardage of the bolt.

Now in using the measuring device for obtaining the yardage of a bolt of cloth F rolled flat on a board G, as indicated in Figs. 1 and 2, the operator first counts the number of folds in the bolt from the board G to the outside fold; say, for instance, the operator counts 37 folds. The stick A is now applied across one end of the bolt F, so that the projecting end of the pin B rests against the outermost fold at one side, and the operator now reads off the number on the graduation C, opposite the outermost fold on the opposite side, that is, reading the number 53, as indicated in Fig. 2. The operator now multiplies this figure 53 with the numeral 37, indicating the number of folds, thus obtaining 1961. From this number two decimal places are pointed off, thus giving 19.61 yards in the bolt F.

When it is desired to find the yardage of a bolt rolled round and solid then use is made of the scale D, that is, the stick A is placed diametrically across one end of the bolt with the end of the pin B resting against one side of the outer fold, and the operator reads off the corresponding fraction on the scale D on the opposite end of the bolt, say 84. The operator now counts the number of folds in the bolt from the center to the outside, and finds, say, 62 folds; then this number is multiplied with the scale D numeral 84, thus obtaining 5208, from which amount two decimal places are pointed off, thus giving 52.08 yards in a roll.

In case the roll has a hollow center, then the operator proceeds as above described, that is, counts the number of folds, and obtains the diameter of the bolt by the use of the graduation D. Then by this same graduation the diameter of the hollow center of the bolt is measured and then the two measurements obtained are added, and the sum thus found is multiplied by the number of folds contained in the bolt. Thus if the diameter of the bolt by the scale D is 72, and the diameter of the hollow center is found to be 18, then these two numbers added give 90, which is multiplied by the number of folds, say 80, the product being 54, which is the yardage of the hollow roll. In the above example, the diameter of the hollow center is one-fourth of the diameter of the roll and consequently the bolt would have one-fourth less number of folds than would the solid bolt. The remaining folds however would be of greater average length than if the roll were solid, the difference in length being represented by the average length of the folds corresponding to the hollow center.

In practice I prefer to indicate the fractions of the scale D by consecutive numerals, while the fractions of the scale C are indicated by even numerals only, thus readily distinguishing the two scales, to prevent the user thereof from using the wrong one.

For measuring bolts of cloth, carpets and the like the pin B is made rather long, so as to readily engage the one side of the bolt even if the bolt is unevenly rolled. For ribbons the stick A is used at the scale E having the short pin B', but otherwise the scale E is used in the same manner as above described in reference to the scale D.

It will be observed, that each graduation of each of the scales is an aliquot part of the diameter of the standard bolt whose yardage is equal to the number of folds.

Having thus described my invention, I claim as new and desire to secure by Letters Patent.

1. A measuring device for obtaining the length of a bolt of cloth or other fabric without unrolling the bolt, comprising a stick having a linear graduation thereon for measuring the width of one end of the bolt, the unit of graduation being an aliquot part of the diameter of a standard bolt whose yardage is equal to the number of folds.

2. A measuring device for obtaining the length of a bolt of cloth or other fabric without unrolling the bolt, comprising a stick having a linear graduation thereon, the linear graduation having fractions, each of which represents $\frac{1}{100}$ of the yardage of a standard bolt measured at the bolt's diameter, the said graduation serving for measuring the width of one end of the bolt, the said graduation and the number of folds in the bolt forming the multiplicand and the multiplicator for obtaining the yardage of the bolt.

3. A measuring device for obtaining the length of a bolt of cloth or other fabric without unrolling the bolt, comprising a stick having a transverse gage pin, and linear scales on opposite faces of the stick, said gage pin being the zero point for the graduations, the unit of graduation being an aliquot part of the diameter of a standard bolt, one of the scales being for measuring bolts rolled flat on boards, and the other scale being for measuring bolts rolled round, either solid or hollow center.

In testimony whereof I have signed my name to this specification in the presence of two subscribing witnesses.

ALBERT EDWARD THOMSON.

Witnesses:
M. O. DOWD,
RALPH THOMSON.